(12) United States Patent
Shindo et al.

(10) Patent No.: US 10,661,125 B2
(45) Date of Patent: May 26, 2020

(54) GOLF BALL AND METHOD OF MANUFACTURING THE SAME

(71) Applicant: Bridgestone Sports Co., Ltd., Minato-ku, Tokyo (JP)

(72) Inventors: Jun Shindo, Chichibushi (JP); Tsuyoshi Nakajima, Chichibushi (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 0 days.

(21) Appl. No.: 16/197,514

(22) Filed: Nov. 21, 2018

(65) Prior Publication Data

US 2019/0134467 A1 May 9, 2019

Related U.S. Application Data

(63) Continuation-in-part of application No. 15/806,506, filed on Nov. 8, 2017, now Pat. No. 10,173,104, (Continued)

(30) Foreign Application Priority Data

Jun. 23, 2015 (JP) ................................. 2015-125323

(51) Int. Cl.
*B29D 99/00* (2010.01)
*A63B 37/06* (2006.01)
(Continued)

(52) U.S. Cl.
CPC ............ *A63B 37/06* (2013.01); *A63B 37/005* (2013.01); *A63B 37/008* (2013.01); *A63B 37/0023* (2013.01); *A63B 37/0039* (2013.01); *A63B 37/0076* (2013.01); *A63B 37/0082* (2013.01); *A63B 45/00* (2013.01); *C08J 9/0066* (2013.01);
(Continued)

(58) Field of Classification Search
CPC .......... A63B 2037/065; A63B 37/0051; A63B 37/003; A63B 37/06; A63B 37/0039; A63B 37/0075; A63B 37/0076; A63B 37/005; A63B 45/00; C08K 5/14; B29L 2031/546
See application file for complete search history.

(56) References Cited

U.S. PATENT DOCUMENTS 5,019,319 A 5/1991 Nakamura et al.
5,688,192 A 11/1997 Aoyama
(Continued)

FOREIGN PATENT DOCUMENTS

JP 3958833 B2 8/2007
JP 5166056 B2 3/2013

*Primary Examiner* — John E Simms, Jr.
(74) *Attorney, Agent, or Firm* — Sughrue Mion, PLLC (57) ABSTRACT

The invention provides a golf ball having a core and a cover of one or more layer encasing the core, wherein the core has a center core and a foamed outer layer that directly, or indirectly through another layer, envelops the center core. The foamed outer layer is made of a rubber composition that includes a base rubber, a co-crosslinking agent and an organic peroxide. The foamed outer layer has an inside portion facing the ball center and an outside portion facing the outside of the ball that are unfoamed regions, and contains a foamed region in an intermediate portion therebetween. A method of manufacturing such a golf ball is also provided.

2 Claims, 1 Drawing Sheet

Related U.S. Application Data which is a continuation-in-part of application No. 15/163,137, filed on May 24, 2016, now Pat. No. 9,849,346.

(51) Int. Cl.
*A63B 37/00* (2006.01)
*C08J 9/06* (2006.01)
*C08J 9/00* (2006.01)
*A63B 45/00* (2006.01)
*B29L 31/54* (2006.01)

(52) U.S. Cl.
CPC ............ *C08J 9/06* (2013.01); *A63B 37/0047* (2013.01); *A63B 37/0064* (2013.01); *A63B 37/0066* (2013.01); *A63B 2037/065* (2013.01); *B29L 2031/546* (2013.01); *C08J 2309/00* (2013.01)

(56) References Cited

U.S. PATENT DOCUMENTS

| | | |
|---|---|---|
| 6,180,040 B1 | 1/2001 | Ladd et al. |
| 6,391,966 B1 | 5/2002 | Rajagopalan |
| 6,688,991 B2 | 2/2004 | Sullivan et al. |
| 2003/0032758 A1 | 2/2003 | Harris et al. |
| 2003/0038399 A1 | 2/2003 | Scolamiero |
| 2003/0119989 A1 | 6/2003 | Ladd et al. |
| 2007/0155542 A1* | 7/2007 | Sullivan ............ A63B 37/0063 473/371 |
| 2009/0011866 A1* | 1/2009 | Sullivan ............ A63B 37/0003 473/377 |
| 2010/0009778 A1* | 1/2010 | Rajagopalan ...... A63B 37/0023 473/377 |
| 2013/0072323 A1 | 3/2013 | Lin |
| 2015/0011336 A1* | 1/2015 | Chen .................... B29C 43/003 473/376 |
| 2015/0258388 A1* | 9/2015 | Watanabe ......... A63B 37/0024 473/373 |

\* cited by examiner

GOLF BALL AND METHOD OF MANUFACTURING THE SAME

CROSS-REFERENCE TO RELATED APPLICATION

This application is a continuation-in-part of copending application Ser. No. 15/806,506 filed on Nov. 8, 2017, which is also a continuation-in-part of copending application Ser. No. 15/163,137 filed on May 24, 2016, the entire contents of which are hereby incorporated by reference.

BACKGROUND OF THE INVENTION

The present invention relates to a golf ball having a core in which a gas generated by thermal decomposition of an organic peroxide forms a foamed region, and to a method of manufacture thereof.

Rubber or resin compositions based on synthetic rubbers such as polybutadiene or on various types of thermoplastic resins have hitherto been used as golf ball materials. A number of golf balls have been disclosed in which, for the purpose of improving distance performance and feel at impact, some constituent portion of the ball is in a foamed form.

For example, U.S. Pat. No. 6,688,991 discloses a golf ball having a core which contains a highly neutralized resin material that is foamed in order to control the moment of inertia of the ball. However, this art involves foaming a resin; given that resins generally have a lower resilience than rubbers and that foaming such a resin material lowers the resilience even further, a drawback of such golf balls is that the distance traveled by the ball is greatly reduced.

Also, JP No. 3958833 discloses art wherein a two-layer core has a center core which is produced from a rubber composition that includes a blowing agent. Yet, this art is unable to carry out foaming only in a target range within a single layer of the core. In addition, the two-layer construction of the core increases the production costs.

U.S. Pat. No. 5,688,192 discloses a golf ball having a compressible gaseous material dispersed at the interior. Also, JP No. 5166056 discloses art that includes, within a core-forming rubber composition, thermally expandable microcapsules containing a large amount of gas. However, in these disclosures, the compressible gaseous material and the thermally expandable microcapsules sometimes collapse due to the pressure applied during rubber curing, or may not properly expand, presenting difficulties during manufacture.

SUMMARY OF THE INVENTION

It is therefore an object of this invention to provide a golf ball in which the core can be foamed in a specific range so as to improve and control the properties of the ball, which core can be smoothly and efficiently produced without difficulty in the course of ball manufacture. A further object of the invention is to provide a method for manufacturing such a golf ball.

As a result of extensive investigations, the inventors have discovered a method for producing a core in which a gas generated by thermal decomposition of an organic peroxide forms a foamed region. Moreover, they have found that, with regard to the resulting core in which a foamed region has been formed, the foamed portion of the core deforms to a certain degree upon impact and can thus decrease the radius of gyration of the golf ball, enabling a reduction in the spin rate of the golf ball to be achieved. Also, because the foamed portion accounts for only part and not all of the core interior, it is possible to hold to a minimum the decrease in resilience due to foaming.

Accordingly, this invention provides the following golf ball and method of manufacture thereof.

1. A golf ball having a core and a cover of one or more layer encasing the core, wherein the core has a center core and a foamed outer layer that directly, or indirectly through another layer, envelops the center core, the foamed outer layer being made of a rubber composition which includes a base rubber, a co-crosslinking agent and an organic peroxide, having an inside portion facing a center of the ball and an outside portion facing an outer side of the ball that are unfoamed regions, and containing a foamed region in an intermediate portion therebetween.

2. The golf ball of 1 above, wherein a gas generated by thermal decomposition of the organic peroxide forms the foamed region.

3. The golf ball of 1 above, wherein the organic peroxide includes a first organic peroxide having a first decomposition temperature and a second organic peroxide having a second decomposition temperature, the one-minute half-life temperature of the first organic peroxide being lower than the one-minute half-life temperature of the second organic peroxide.

4. The golf ball of 1 above, wherein the foamed region is concentrically formed as a ring centered on a center of the core.

5. The golf ball of 1 above, wherein the foamed region is formed to a position at a distance of between 30% and 90% of the core radius from, as the origin, a center of the core.

6. The golf ball of 1 above, wherein the specific gravity of the foamed region is at least 5% lower than the specific gravity of the unfoamed regions.

7. The golf ball of 1 above, wherein the material in the foamed region has an average pore size of less than 500 µm.

8. A method for manufacturing a golf ball having a core and a cover of one or more layer encasing the core, which core has a center core and a foamed outer layer that directly, or indirectly through another layer, envelops the center core, the foamed outer layer being a cured molding produced using a first curing mold having a cavity with an inside diameter φ1 and a second curing mold having a cavity with an inside diameter φ2 such that φ1<φ2, which method includes producing a core wherein the center care or a care inner layer sphere consisting of the center core encased by another layer is enveloped by the foamed outer layer via;

a first curing step of peripherally enveloping the center core or the core inner layer sphere with an organic peroxide-containing rubber composition to form a rubber-encased sphere, subsequently placing the rubber-encased sphere in the first curing mold and applying heat and pressure under given temperature and time conditions to form a semi-cured rubber-encased spherical molding; and a second curing step of removing the semi-cured rubber-encased spherical molding from the first mold following the first curing step, transferring the semi-cured rubber-encased spherical molding to the second curing mold and applying heat and pressure wider given temperature and time conditions, wherein the foamed outer layer has an inside portion facing a center of the ball and an outside portion facing an outer side of the ball that are unfoamed regions, and contains a foamed region in an intermediate portion therebetween.

9. The golf ball manufacturing method of 8 above, wherein the curing time in the first curing step is in the range of from 33 to 60% of the sum of the curing time in the first curing step and the curing time in the second curing step.

BRIEF DESCRIPTION OF THE DIAGRAMS

DETAILED DESCRIPTION OF THE INVENTION

The invention is described more fully below.

Figure 1:
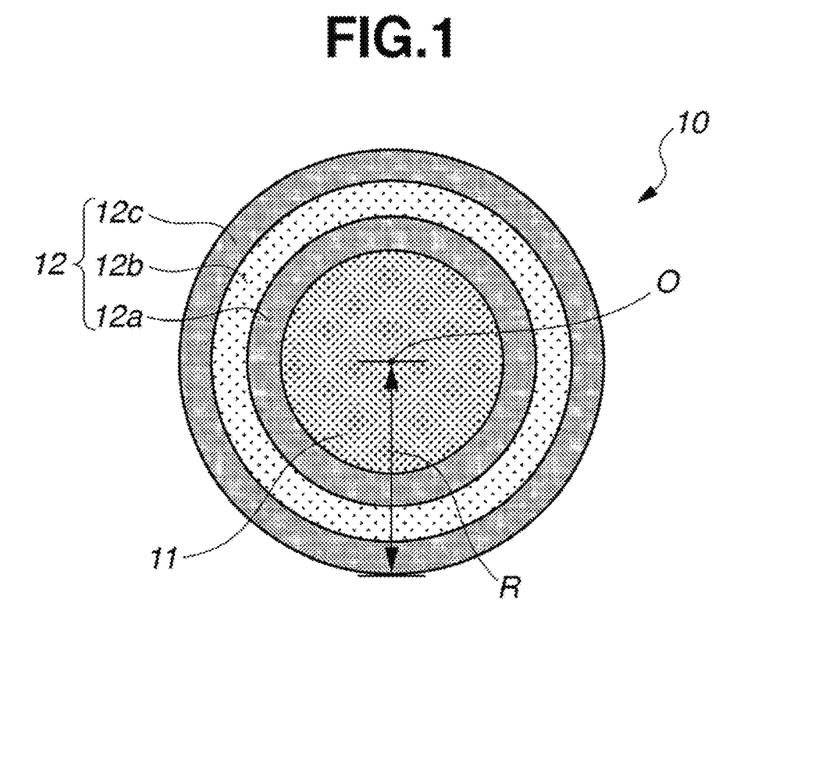
FIG. 1 is a schematic sectional diagram showing the foamed region formed in an intermediate portion of the foamed outer layer of the core of a golf ball according to one embodiment of the invention.

The golf ball of the invention has a core and a cover of one or more layer encasing the core. Also, in this invention, the core has a center core and a foamed outer layer that directly, or indirectly through another layer, envelops the center core. For example, referring to FIG. 1, which is a diagram showing an embodiment of the core, the core 10 has a center core 11 and a foamed outer layer 12. In this foamed outer layer 12, an inside portion 12a facing the ball center and an outside portion 12c facing the outside of the ball are unfoamed regions, and an intermediate portion therebetween represents a foamed region 12b. The center core, the other layer and the foamed outer layer are collectively referred to in the following description as "constituent members of the core."

These constituent members of the core (i.e., the center core, the other layer, and the foamed outer layer) are formed of rubber compositions which include a base rubber such as polybutadiene rubber, a co-crosslinking agent, an organic peroxide and, where necessary, other ingredients such as fillers.

The use of polybutadiene as the base rubber of the rubber composition is preferred. The polybutadiene is preferably one having a cis-1,4 bond content on the polymer chain of at least 80 wt %, more preferably at least 90 wt %, and even more preferably at least 95 wt %. At a content of cis-1,4 bonds among the bonds on the polybutadiene molecule which is too low, the resilience may decrease. The polybutadiene has a content of 1,2-vinyl bonds on the polymer chain of preferably not more than 2 wt %, more preferably not more than 1.7 wt %, and even more preferably not more than 1.5 wt %. At a 1,2-vinyl bond content which is too high, the resilience may decrease.

To obtain a cured molding of the rubber composition having a good resilience, the polybutadiene included is preferably one synthesized with a rare-earth catalyst or a group VIII metal compound catalyst. A polybutadiene synthesized with a rare-earth catalyst is especially preferred.

Rubber ingredients other than the above polybutadiene may be included in the rubber composition, provided that doing so does not detract from the advantageous effects of the invention. Illustrative examples of rubber ingredients other than the above polybutadiene include other polybutadienes and also other diene rubbers, such as styrene-butadiene rubber, natural rubber, isoprene rubber and ethylene-propylene-diene rubber.

Examples of co-crosslinking agents include unsaturated carboxylic acids and the metal salts of unsaturated carboxylic acids. Specific examples of unsaturated carboxylic acids include acrylic acid, methacrylic acid, maleic acid and fumaric acid. The use of acrylic acid or methacrylic acid is especially preferred. Metal salts of unsaturated carboxylic acids include, without particular limitation, the above unsaturated carboxylic acids that have been neutralized with desired metal ions. Specific examples include the zinc salts and magnesium salts of methacrylic acid and acrylic acid. The use of zinc acrylate is especially preferred.

The unsaturated carboxylic acid and/or metal salt thereof is included in an amount, per 100 parts by weight of the base rubber, which is preferably at least 5 parts by weight, more preferably at least 10 parts by weight, and even more preferably at least 15 parts by weight. The amount included is preferably not more than 60 parts by weight, more preferably not more than 50 parts by weight, and even more preferably not more than 45 parts by weight. Too much may make the core too hard, giving the ball an unpleasant feel at impact, whereas too little may lower the rebound.

The organic peroxide used in the invention is a compound which induces crosslinking reactions via radicals generated therefrom by thermal decomposition, and from which, especially when used in the material that forms, of the constituent members of the core, the foamed outer layer, a gas that acts as a blowing agent is generated by thermal decomposition. Examples of the organic peroxide include dialkyl peroxides such as dicumyl peroxide, di(2-t-butylperoxyisopropyl)benzene, t-butylcumyl peroxide, di-t-butyl peroxide, 2,5-dimethyl-2,5-di(t-butylperoxy)hexane, di-t-hexyl peroxide and 2,5-dimethyl-2,5-di(t-butylperoxy)hexane-3; peroxyketals such as 1,1-bis(t-butylperoxy)-3,3,5-trimethylcyclohexane, 1,1-di(t-hexylperoxy)-3,3,5-trimethylcyclohexane, 1,1-di(t-hexylperoxy)cyclohexane, 2,2-di(4,4-di-(t-butylperoxy)cyclohexyl)propane, n-butyl-4,4-di(t-butylperoxy)valerate and 1,1-di(t-butylperoxy)cyclohexane, diacyl peroxides such as diisobutyryl peroxide, di(3,3,5-trimethylhexanoyl) peroxide, dilauroyl peroxide and disuccinic acid peroxide; peroxy esters such as 1,1,3,3-tetramethylbutylperoxy-2-ethylhexanoate, t-hexylperoxy-2-ethylhexanoate, t-butylperoxy-2-ethylhexanoate, t-butylperoxylaurate and t-butylperoxyacetate; ketone peroxides such as cyclohexanone peroxide and acetylacetone peroxide; hydroperoxides such as p-menthane hydroperoxide and diisopropylbenzene hydroperoxide; and peroxydicarbonates such as diisopropyl peroxydicarbonate and di(4-t-butylcyclohexyl) peroxydicarbonate.

The organic peroxide may be a commercially available product, specific examples of which include those having the trade names Percumyl D, Perhexa C-40, Perbutyl P, Perbutyl C, Perbutyl 1), Perhexa 25B, Perhexyl D, Perhexyne 25B, Perhexa TMH, Perhexa HC, Pertetra A and Perhexa V, and also Peroyl IB, Peroyl 335, Peroyl L, Peroyl SA, Perbutyl L, Perbutyl A, Perocta O, Perhexyl O, Perbutyl O, Perhexa H, Percure AH, Permentha H, Percumyl P, Peroyl IPP and Peroyl TCP (all available from NOF Corporation), and that having the trade name Trigonox 29-40B (40% concentration product, from Akzo Nobel N.V.).

The organic peroxide may be of one type used alone or two or more types may be used together. When two or more organic peroxides are blended and used together, by using in combination organic peroxides having different one-minute half-life temperatures or using in combination organic peroxides having different crosslinking efficiencies, crosslinking of the constituent members of the core and foaming of, among the constituent members of the core, the intermediate portion of the foamed outer layer can be controlled to an intended shape. For example, in cases where two types of organic peroxides A and B are used, organic peroxide A is made to act primarily as a crosslinking agent, along with which an organic peroxide having a lower decomposition temperature than organic peroxide A and having a much smaller rubber crosslinking efficiency than organic peroxide A is used as organic peroxide B. By using two such differing organic peroxides, as subsequently described, the rubber curing operation is divided into a first curing step and a second curing step, together with which foaming in the intermediate portion of the foamed outer layer can be achieved.

The amount of organic peroxide included per 100 parts by weight of the base rubber is preferably at least 0.1 part by weight, more preferably at least 0.3 part by weight, even more preferably at least 0.5 part by weight, and most preferably at least 0.7 part by weight. The upper limit is preferably not more than 5 parts by weight, more preferably not more than 4 parts by weight, even more preferably not more than 3 parts by weight, and most preferably not more than 2 parts by weight. When too much or too little is included, it may not be possible to obtain a ball having a good feel, durability and rebound, in addition to which it may not be possible to obtain a suitable foamed region, foam cell size and foam density in the intermediate portion of the foamed outer layer.

An inert filler may be included as another ingredient. Examples of preferred inert fillers include zinc oxide, barium sulfate and calcium carbonate. These may be used singly or two or more may be used together. The amount of inert filler included per 100 parts by weight of the base rubber is preferably at least 1 part by weight, and more preferably at least 5 parts by weight. The upper limit in the amount included is preferably not more than 100 parts by weight, more preferably not more than 80 parts by weight, and even more preferably not more than 60 parts by weight. Too much or too little inert filler may make it impossible to obtain a suitable weight and a good rebound.

In addition, an antioxidant may be optionally included. Illustrative examples of suitable commercial antioxidants include Nocrac NS-6, Nocrac NS 30 and Nocrac 200 (all available from Ouchi Shinko Chemical Industry Co., Ltd.), and Yoshinox 425 (Yoshitomi Pharmaceutical Industries, Ltd.). These may be used singly or as a combination of two or more thereof. The amount of antioxidant included can be set to more than 0, and may be set to an amount per 100 parts by weight of the base rubber which is preferably at least 0.05 part by weight, and more preferably at least 0.1 part by weight. The maximum amount included per 100 parts by weight of the base rubber, although not particularly limited, may be set to preferably not more than 3 parts by weight, more preferably not more than 2 parts by weight, even more preferably not more than 1 part by weight, and most preferably not more than 0.5 part by weight. Too much or too little antioxidant may make it impossible to achieve a suitable core hardness gradient, a good rebound and durability, and a good spin rate-lowering effect on full shots.

An organosulfur compound may be optionally included in the rubber composition in order to increase the resilience of the constituent members of the core. In cases where an organosulfur compound is included, the amount thereof per 100 parts by weight of the base rubber may be set to preferably at least 0.05 part by weight, and more preferably at least 0.1 part by weight. The upper limit in the amount of the organosulfur compound may be set to preferably not more than 5 parts by weight, more preferably not more than 4 parts by weight, and even more preferably not more than 2 parts by weight. Including too little organosulfur compound may make it impossible to obtain a sufficient resilience-increasing effect on the constituent members of the core. On the other hand, when too much is included, the hardness of the constituent members of the core may become too low, worsening the feel of the ball at impact, and the durability of the ball to cracking on repeated impact may worsen.

In this invention, even without particularly making use of a known blowing agent, as noted above, a foamed region can be formed in the intermediate portion of the foamed outer layer by a gas that is generated as a thermal decomposition product of the organic peroxide. Therefore, it is preferable to not use known blowing agents, including commercial products, as rubber compounding ingredients in the present invention. "Blowing agent" is to be understood here as not including organic peroxides.

In the practice of the invention, the rubber composition described above is cured and molded to create the center core or a core inner layer sphere consisting of the center core encased by another layer. Production of these constituent members of the core can generally be carried out in the usual manner by molding the rubber composition into a spherical molded product using heat and compression under curing conditions of at least 140° C. and not more than 180° C. for at least 10 minutes and not more than 60 minutes. Next, a foamed outer layer is formed over the center core or the core inner layer sphere consisting of the center core encased by another layer. A foamed outer layer having a foamed region and unfoamed regions can be obtained by, for example, using a first curing mold and a second curing mold in which the inside diameter $\phi 1$ of the first curing mold cavity has been set so as to be smaller than the inside diameter $\phi 2$ of the second curing mold cavity, and employing a production method that includes the first and second curing steps below. It has already been mentioned that, in cases where two types of organic peroxides A and B are used, organic peroxide A can be made to act primarily as a crosslinking agent and an organic peroxide baying a lower decomposition temperature than organic peroxide A and having a much smaller rubber crosslinking efficiency than organic peroxide A can be used as organic peroxide B. A temperature and time sufficient for organic peroxide A to decompose and for the rubber composition crosslinking reaction to proceed can be selected as the curing and molding conditions.

[First Curing Step]

The first curing step entails placing an encased sphere consisting of the center core, or the core inner layer sphere obtained by encasing the center core with another layer, enveloped by an organic peroxide-containing rubber composition in the first curing mold and applying heat and pressure under given temperature and time conditions to form a semi-cured rubber-encased spherical molding.

[Second Curing Step]

The second curing step entails removing the semi-cured rubber-encased spherical molding from the first curing mold following the first curing step, transferring the semi-cured rubber-encased spherical molding to the second curing mold and applying heat and pressure under given temperature and time conditions.

The curing time in the first curing step is preferably in the range of 20 to 75%, and more preferably 33 to 60%, of the sum of the curing time in the first curing step and the curing time in the second curing step. When the rubber composition is heated, because heat travels from the surface to the center of the spherical rubber composition, by adjusting the curing time in this way, the distance reached by the temperature from the core surface toward the inside thereof can be adjusted, thus enabling the foamed region to be set in a more preferable position.

In these curing steps, the first curing mold has a cavity inside diameter $\phi 1$ and the second curing mold has a cavity inside diameter φ2 such that φ1<φ2, thereby enabling a foamed outer layer composed of a foamed region and unfoamed regions to be obtained. That is, in the first curing step, the foamed outer layer-funning rubber composition is heated to a temperature at which the organic peroxide decomposes. When the semi-cured rubber composition is subsequently removed from the first curing mold, the gas generated by decomposition of the organic peroxide expands, creating a foamed region within the semi-cured foamed outer layer-forming rubber composition. The composition is then placed in the second curing mold and is again heated, whereupon an organic peroxide decomposition reaction proceeds and curing is brought to completion, with a foamed area remaining within the cured and molded composition. The foamed area is often present as a concentric ring about the core center. This is because, during heating of the foamed outer layer-forming rubber composition, heat travels from the surface toward the center of the foamed outer layer-forming rubber composition having a ring-shaped cross-section, and at the region which is reached by the heat and attains a temperature at which the organic peroxide decomposes, when the rubber composition is taken out of the mold, the foamed area forms due to expansion of the decomposition gas produced by thermal decomposition of the organic peroxide. At this time, substantially no foaming occurs on the surface side of the foamed area. The reason is that, along with the organic peroxide decomposition reactions, crosslinking reactions on the foamed outer layer-forming rubber composition already have gone to completion in this region, preventing the organic peroxide decomposition gas from expanding even when the rubber composition is removed from the mold. Foaming also has not occurred inside of the foamed area (the inner side facing the center of the ball), the reason being that the temperature of the rubber composition has not risen in this region and so decomposition of the organic peroxide does not occur and the decomposition gas is not generated.

The generated gas that is a thermal decomposition product of the above organic peroxide also depends on the type of organic peroxide, and is exemplified by α-cumyl alcohol, acetophenone, methane, acetone, t-butanol and n-heptane. A foamed region is created within the foamed outer layer-forming rubber composition due to the expansion of these gases.

By way of these curing steps, a cured molding (foamed outer layer) can be obtained which has unfoamed regions at an inside portion thereof facing the center of the ball and at an outside portion facing the outside of the ball, and contains a given foamed region in an intermediate portion therebetween. Next, the foamed region and unfoamed regions at specific interior portions of the foamed outer layer are described.

The inventive golf ball is characterized in that the inside portion and outside portion (surface side portion) of the foamed outer layer are unfoamed regions, and the foamed outer layer contains a foamed region in the intermediate portion therebetween. For example, referring to FIG. 1, the foamed outer layer 12 with a ring-shaped cross-section has an inside portion 12a and an outside portion (surface side portion) 12c which are unfoamed regions, and has an intermediate portion 12b separated by a given distance from the core center O where a concentric ring-like foamed region is present.

The foamed outer layer has a thickness which, although not particularly limited, is preferably at least 2 mm, more preferably at least 5 mm, and even more preferably at least 10 mm. The upper limit is preferably not more than 20 mm, and more preferably not more than 15 mm. When this thickness is too small, it may be difficult to control the foamed region and the unfoamed regions. On the other hand, when this thickness is too large, the functionality of a multilayer core may not be exhibited, which may adversely affect the inherent flight performance, durability and the like of the golf ball.

The foamed region is created at a position located at a distance of 30 to 90%, preferably 40 to 80%, and more preferably 50 to 80%, of the core radius R from, as the origin, the core center. By thus having a position located at a desired distance from the core center be a foamed area, the part of the core that undergoes the greatest deformation at the time of impact can be imparted with sufficient "give," enabling the spin rate-lowering effect to be maximized. For example, when the core diameter is 36 mm, it is preferable for the foamed area to be within the range of 5.4 to 16.2 mm from the core center.

Figure 2:
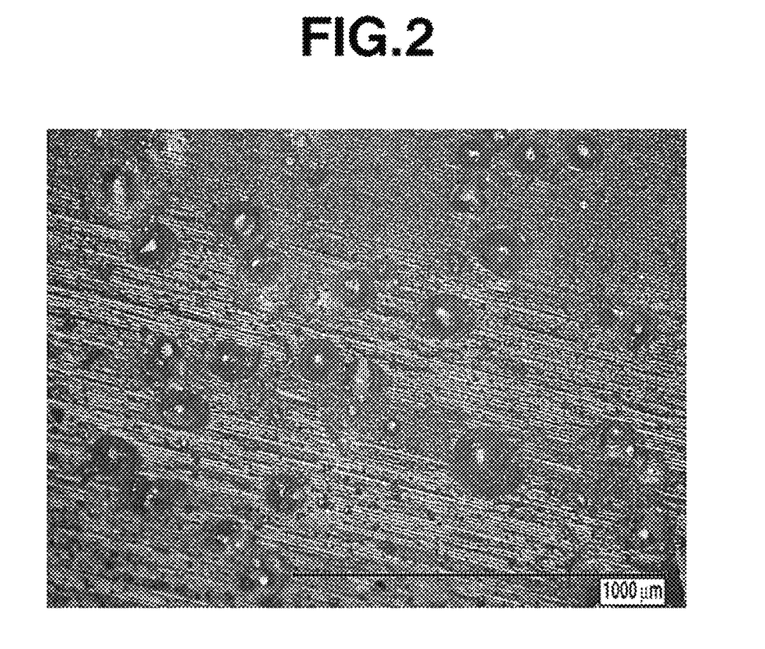
FIG. 2 is a photograph showing the foamed region (foam cells) observed under an optical microscope.

Determination of the foamed region in this invention is carried out as described below. The core is cut hemispherically and the core cross-section is examined at 1 mm intervals from the center to the surface of the core using an optical microscope. When the sum of the surface areas of foam cells within a 1 mm square region in the examined image accounts for 5% or more of the total surface area, that region is considered to be foamed. In order to carry out detailed observation, it is preferable to set the magnification to at least 100×. Use may be made of image analysis software or the like to determine the sum of the surface areas of foam cells. FIG. 2 is a photograph showing a foamed region (foam cells) observed with an optical microscope. In this photograph, the round areas are foamed areas. When the surface areas of such round areas are measured and found to be 5% or more, this region of the core is considered for the purposes of this invention to be a "foamed region."

It is preferable for the specific gravity of the foamed region to be lower than the specific gravity of the unfoamed regions. In particular, it preferable for the foamed region to have a specific gravity which is at least 5% lower than the specific gravity of the unfoamed regions. This specific gravity relationship can be regulated by suitably controlling conditions such as the curing time, curing temperature and amount of organic peroxide added.

The specific gravities of the foamed region and the unfoamed regions are determined as follows.

A circular disk having a thickness of 2 mm is cut from the core by passing through the geometric center thereof, the foamed region and unfoamed regions are determined in the manner described above, and a punch press is used to punch out 3 mm diameter samples of these regions. Samples are collected at three places for each region. Each sample is examined with an optical microscope and the volume is determined. At the same time, the weight of the sample is measured on an electronic scale, and the actual specific gravity is calculated by dividing the weight by the volume. The specific gravities are similarly determined at all three places and the results are averaged, giving the specific gravity for that region. In cases where foaming extends over a wide range, it is preferable to collect samples near the intermediate portion of this region. Because the punched samples have a shape resembling two vertically adjoining truncated cones, the overall volume can be determined by calculating the volumes of the two truncated cones and adding them together. The method of measurement is exemplified by, but not limited to, this volume calculation method.

The foamed region has a hardness which, compared with the internal hardness profile value measured at the same distance from the core center in a core of the same deflection that was produced under non-foaming conditions, is preferably at least 1 point softer, and more preferably at least 3 points softer, on the JIS-C hardness scale. A lower foamed region hardness makes it possible to obtain the desired core hardness profile, reduce the radius of gyration owing to deformation of the foamed areas, and thereby achieve a lower spin rate when the ball is hit.

The average foam cell size in the foamed region depends in part on the type of organic peroxide used, but is preferably less than 500 μm. By having the average cell size of the material in the foamed region be less than 500 μm, strain at the time of impact can be uniformly dispersed, making it possible to suppress a marked decline in durability.

The center core may be made of the above-described rubber composition, may be a foam center core, or may be made of a resin, metal or the like. In cases where a material such as rubber, foam or resin is used, if necessary, various filters, crosslinking agents and the like may also be added.

The diameter and weight of the center core are not particularly limited. Also, the shape of the center core is not limited to that of a sphere, and may be a special shape such as that of a sphere with ribs formed thereon.

Another layer may be provided between the center core and the foamed outer layer. In this case, aside from the already described rubber composition, various thermoplastic resins and thermoplastic elastomers may be used as the material making up the other layer. The other layer may be one or more layer provided as a constituent member of the core.

It is recommended that the deflection of the core, as measured by placing the core between steel plates and compressing the core under a final load of 1,275 N (130 kgf) from an initial load of 98 N (10 kgf), although not particularly limited, be preferably at least 2.5 mm, more preferably at least 2.8 mm, and even more preferably at least 3.0 mm, and that the upper limit be preferably not more than 8.0 mm, more preferably not more than 7.8 mm, and even more preferably not more than 7.5 mm.

Next, the cover used in the inventive golf ball is described. The cover is a member that encases the core and is composed of at least one layer. Exemplary covers include two-layer covers and three-layer covers. In the case of a two-layer cover, the inner layer is referred to as the intermediate layer and the outer layer is referred to as the outermost layer. In the case of a three-layer cover, the respective layers are referred to, in order from the inside: the envelope layer, the intermediate layer and the outermost layer.

Known resins may be used without particular limitation as the resin material that forms the cover. Use can be made of one or more resin selected from the group consisting of ionomer resins and, e.g., urethane-, amide-, ester-, olefin- and styrene-based thermoplastic elastomers. Alternatively, a resin material such as polyurethane or polyurea may be used to form the cover.

The ionomer resin is not subject to any particular limitation, and may be a known product. Commercial products that may be used as the ionomer resin include, for example, H1706, H1605, H1557, H1601, AM7329, AM7317 and AM7318, all of which are available from DuPont-Mitsui Polychemicals Co.

Thermoplastic elastomers are exemplified by polyester elastomers, polyamide elastomers and polyurethane elastomers. The use of a polyurethane elastomer is especially preferred.

The polyurethane elastomer is not particularly limited, provided it is an elastomer composed primarily of polyurethane. A morphology that includes soft segments composed of a high-molecular-weight polyol compound and hard segments composed of a diisocyanate and a monomolecular chain extender is preferred.

Exemplary polymeric polyol compounds include, but are not particularly limited to, polyester polyols and polyether polyols. From the standpoint of rebound resilience or low-temperature properties, the use of a polyether polyol is preferred. Examples of polyether polyols include polytetramethylene glycol and polypropylene glycol, with the use of polytetramethylene glycol being especially preferred. These compounds have a number-average molecular weight of preferably from 1,000 to 5,000, and more preferably from 1,500 to 3,000.

Exemplary diisocyanates include, but are not particularly limited to, aromatic diisocyanates such as 4,4'-diphenylmethane diisocyanate, 2,4-diisocyanate and 2,6-toluene diisocyanate; and aliphatic diisocyanates such as hexamethylene diisocyanate. In the practice of this invention, from the standpoint of reaction stability with the subsequently described isocyanate mixture when blended therewith, the use of 4,4'-diphenylmethane diisocyanate is preferred.

The monomolecular chain extender is not particularly limited, although use can be made of an ordinary polyol or polyamine. Specific examples include 1,4-butylene glycol, 1,2-ethylene glycol, 1,3-propylene glycol, 1,3-butanediol, 1,6-hexylene glycol, 2,2-dimethyl-1,3-propanediol, 1,3-butylene glycol, dicyclobexylmethylmethanediamine (hydrogenated MDA) and isophoronediamine (IPDA). These chain extenders have average molecular weights of preferably from 20 to 15,000.

A commercial product may be used as the polyurethane elastomer. Illustrative examples include Pandex T7298, TR3080, T8230, T8290, T8295 and T8260 (all available from DIC Bayer Polymer, Ltd.), and Resamine 2593 and 2597 (available from Dainichiseika Color & Chemicals Mfg. Co., Ltd.). These may be used singly, or two or more may be used in combination.

The material which forms the cover is exemplified by a resin composition containing as the essential ingredients: 100 parts by weight of a resin component composed of, in admixture, (A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer a weight ratio between 100:0 and 0:100, and (B) a non-ionomeric thermoplastic elastomer in a weight ratio between 100:0 and 50:50;

(C) from 5 to 120 parts by weight of a fatty acid and/or fatty acid derivative having a molecular weight of from 228 to 1,500; and (D) from 0.1 to 17 parts by weight of a basic inorganic metal compound capable of neutralizing un-neutralized acid groups in components (A) and (C).

Components (A) to (D) in the resin material described in, for example, JP-A 2011-120898 may be advantageously used as above components (A) to (D).

Various additives may be optionally included in the cover-forming material. For example, pigments, dispersants, antioxidants, light stabilizers, ultraviolet absorbers and internal mold lubricants may be suitably included.

A known method may be used without particular limitation as the method of forming the layers of the cover. For example, use may be made of a method in which a prefabricated core or a sphere encased by various layers is placed in a mold, and the resin material prepared as described above is injection-molded over the core or layer-encased sphere. In addition, a layer of paint may be applied to the surface of the outermost layer of this cover.

Numerous dimples are typically formed on the outer surface of the cover (outermost layer) to improve the aerodynamic performance of the ball. The dimple shapes used may be of one type or a combination of two or more types selected from among circular shapes, various polygonal shapes, dewdrop shapes and oval shapes.

The golf ball of the invention can be made to conform to the Rules of Golf for competitive play. Specifically, the inventive ball may be formed to a diameter which is such that the ball does not pass through a ring having an inner diameter of 42.672 mm and is not more than 42.80 mm, and to a weight which is preferably from 45.0 to 45.93 g.

As explained above, with the inventive golf ball and method of manufacture thereof, the foamed areas of the core deform to a certain degree at the time of impact, as a result of which the radius of gyration of the golf ball decreases, enabling a reduction in the spin rate of the golf ball to be achieved. Also, because the foamed areas account for only part and not all of the core interior, the decrease in resilience due to foaming can be held to a minimum.

EXAMPLES

The following Examples and Comparative Examples are provided to illustrate the invention, and are not intended to limit the scope thereof.

Working Examples 1 to 7, Comparative Example 1

Formation of Center Core

Center Core Materials A to C (see Table 1 below) were famished for use in Working Examples 1 to 7 and Comparative Example 1. In Table 1, material A, which is a rubber composition, was cured at 160° C. for 10 minutes, thereby producing a spherical cured molding which was used as the center core. Material B, which is an acid-containing polymer (ethylene-methacrylic acid-acrylic ester terpolymer), was injection-molded to give a spherical resin molding. Material C was an aluminum sphere having a diameter of 7 mm.

TABLE 1

| Ingredients (pbw) | A | B | C |
|---|---|---|---|
| Polybutadiene | 100 | | |
| Zinc oxide | 28.2 | | |
| Barium sulfate | 0 | | |
| Antioxidant | 0.1 | | |
| Zinc acrylate | 20 | | |
| Organic Peroxide A | 0.5 | | |
| Acid-containing polymer | | 100 | |
| Aluminum sphere | | | 100 |

Details on the ingredients shown in Table 1 are given below

Polybutadiene rubber: Available under the trade name "BR 01" from JSR Corporation Zinc oxide: Available under the trade name "Zinc Oxide Grade 3" from Sakai Chemical Co., Ltd.

Barium sulfate: Available under the trade name "Barico #100" from Hakusui Tech

Antioxidant: Available under the trade name "Nocrac NS-6" from Ouchi Shinko Chemical industry Co., Ltd.

Zinc acrylate: Available under the trade name "ZN-DA85S" from Nippon Shokubai Co., Ltd.

Organic Peroxide A: Available under the trade name "Percumyl D" from NOF Corporation Acid-containing polymer: Available under the trade name "Nucrel 4319" from DuPont-Mitsui Polychemicals Co., Ltd.

Next, the center core was peripherally encased by a foamed outer layer. First, the foamed outer layer-forming rubber composition I or II shown in Table 2 below was furnished, this rubber composition was kneaded, and the center core was enveloped by the kneaded rubber, thereby forming a layer of kneaded rubber over the center core. This kneaded rubber-encased sphere was then set in a first curing mold having a cavity radius of 36.40 mm and curing was carried out at 155° C. for the curing time shown in Table 4. Next, using a second curing mold having a cavity radius of 37.10 mm, the semi-cured rubber molding was cured and molded at 155° C. for the curing time shown in Table 4, thereby producing a solid core having a center core and a foamed outer layer. After cooling, the core surface was abraded in order to increase adhesion between the core and the envelope layer, thereby giving solid cores for Working Examples 1 to 7. The solid core of Comparative Example 1 was obtained in a single curing step using a mold having a cavity radius of 37.10 mm.

TABLE 2

| Ingredients (pbw) | I | II |
|---|---|---|
| Polybutadiene | 100 | 100 |
| Zinc oxide | 4 | 4 |
| Barium sulfate | 19.07 | 34.53 |
| Antioxidant | 0.1 | 0.1 |
| Zinc acrylate | 36.5 | 39.25 |
| Organic Peroxide A | 1 | 1 |
| Organic Peroxide B | | 2 |

Details on the ingredients in Table 2 are the same as for the ingredients in Table 1. Organic Peroxide B is available under the trade name "Perbutyl O" from NOF Corporation.

Formation of Cover

A multi-piece solid golf ball having a five-layer construction consisting of a core encased by, in order, an envelope layer, an intermediate layer and an outermost layer was manufactured by injection molding a three-layer cover (envelope layer, intermediate layer and outermost layer) having the properties shown in Table 3 below over the core obtained as described above. Although not shown in the diagrams, in each of the Working Examples and in the Comparative Example, dimples were formed on the surface of the ball cover in a specific pattern common to all the Examples.

TABLE 3

| Outermost layer | Material | Ionomer [1] |
| --- | --- | --- |
| | Thickness | 1.28 mm |
| Intermediate layer | Material | Ionomer [2] |
| | Thickness | 1.27 mm |
| Envelope layer (layer adjoining core) | Material | Polyester elastomer [3] |
| | Thickness | 1.10 mm |

Details on the materials forming the respective cover layers in the above table are given below.
1) A compound obtained by blending Himilan 1605 and Himilan AM7329 (DuPont-Mitsui Polychemicals Co., Ltd.) in a 1:1 ratio.
2) HPF 1000, from DuPont de Nemours & Co., Ltd.
3) Hytrel 3046 from DuPont-Toray Co., Ltd.

Properties of the resulting golf balls, such as the thicknesses and material hardnesses of the layers and the surface hardnesses of various layer-encased spheres, were evaluated by the methods described below. In addition, the flight performance (rate of backspin on shots with a W-#1 and on shots with a I #6) of each ball was evaluated by the method described below, Those results are shown in Table 4.

Deflection of Core and Ball

A core or ball was placed between steel plates and the amount of deflection when compressed under a final load of 1,275 N (130 kgf) from an initial load of 98 N (10 kgf) was measured. The amount of deflection here refers in each case to the measured value obtained after holding the test specimen isothermally at 23.9° C.

Actual Specific Gravity

A circular disk having a thickness of 2 mm was cut from the core by passing through the geometric center thereof, and a punch press was used to punch out 3 mm diameter samples of the foamed region and the unfoamed regions of the core. Samples were collected at three places for each region. Each sample was examined under a VHX-2000 digital microscope from Keyence Corporation, and the volume was determined. At the same time, the weight of the sample was measured on an electronic scale and the actual specific gravity was calculated by dividing the weight by the volume. The specific gravities were similarly determined at all three places and the results were averaged, giving the specific gravity for that region.

Core Hardness Profile

The indenter of a durometer was set so as to be substantially perpendicular to the spherical surface of the core, and the core surface hardness on the JIS-C hardness scale was measured as specified in JIS K6301-1975.

To obtain the cross-sectional hardnesses at the center and other specific positions of the core, the core was hemispherically cut so as form a planar cross-section, and measurements were carried out by pressing the indenter of a durometer perpendicularly against the cross-section at the measurement positions. These hardnesses are indicated as JIS-C hardness values. The core hardness profiles for the Examples are shown in Table 4.

Ball Spin Rate (rpm)

The rite of backspin by the ball immediately after being struck at a head speed (HS) of 45 m/s with a driver (W #1) (TourStage ViQ (2012 model); loft angle, 11.5°; manufactured by Bridgestone Sports Co., Ltd) mounted on a golf swing robot, and immediately after being struck at a head speed (HS) of 38 m/s with a six iron (I #6) (TourStage ViQ (2012 model); manufactured by Bridgestone Sports Co., Ltd) mounted on a golf swing robot were each measured using an apparatus for measuring the initial conditions.

TABLE 4

| | | Comp. Ex. | Working Example | | | | | | |
| --- | --- | --- | --- | --- | --- | --- | --- | --- | --- |
| | | 1 | 1 | 2 | 3 | 4 | 5 | 6 | 7 |
| Center core | Type No | A | A | A | B | C | A | A | A |
| | Diameter (mm) | 10 | 10 | 7 | 10 | 7 | 10 | 10 | 10 |
| Foamed outer layer | Type No. | I | I | I | I | I | II | II | II |
| Curing time (min) | Step 1 | — | 7 | 7 | 7 | 7 | 5 | 7 | 9 |
| | Step 2 | 15 | 8 | 8 | 8 | 8 | 10 | 8 | 6 |
| Solid core | Diameter (mm) | 35.44 | 35.44 | 35.44 | 35.44 | 35.44 | 35.43 | 35.44 | 35.42 |
| | Weight (g) | 27.97 | 27.76 | 27.75 | 27.63 | 27.75 | 27.78 | 27.85 | 28.14 |
| | Deflection (mm) | 4.28 | 4.35 | 4.36 | 4.34 | 4.36 | 4.37 | 4.44 | 4.14 |
| Foamed range (distance from center of core), mm | | | 12 to 14 | 12 to 14 | 12 to 14 | 12 to 14 | 13 to 15 | 11 to 14 | 9 to 12 |
| Specific gravity | Foamed region | | 1.040 | 1.040 | 1.040 | 1.040 | 1.035 | 1.015 | 0.996 |
| | Unfoamed region | | 1.120 | 1.120 | 1.120 | 1.120 | 1.124 | 1.124 | 1.124 |
| | Specific gravity ratio** (%) | | 7.1 | 7.1 | 7.1 | 7.1 | 7.9 | 9.7 | 11.4 |
| Hardness profile at core interior (JIS-C) | 0 mm | 56 | 56 | 57 | 56 | — | 56 | 56 | 56 |
| | 2 mm | 57 | 57 | 57 | 56 | — | 57 | 57 | 57 |
| | 4 mm | 57 | 57 | 62 | 56 | 62 | 57 | 57 | 57 |
| | 6 mm | 62 | 62 | 62 | 62 | 62 | 62 | 62 | 62 |
| | 8 mm | 63 | 63 | 63 | 63 | 63 | 63 | 63 | 63 |
| | 10 mm | 63 | 63 | 63 | 63 | 63 | 63 | 63 | 60 |
| | 12 mm | 66 | 64 | 64 | 64 | 64 | 66 | 64 | 63 |
| | 14 mm | 70 | 68 | 68 | 68 | 68 | 67 | 67 | 70 |
| | 16 mm | 72 | 72 | 72 | 72 | 72 | 72 | 72 | 72 |
| | Surface | 74 | 74 | 74 | 74 | 74 | 74 | 74 | 74 |
| Ball deflection (mm) | | 3.20 | 3.25 | 3.25 | 3.24 | 3.25 | 3.30 | 3.35 | 3.09 |
| Backspin rate (rpm) on W#1 shots | | 3,080 | 3,060 | 3,060 | 3,060 | 3,060 | 3,060 | 3,030 | 3,050 |
| Backspin rate (rpm) on I#6 shots | | 6,060 | 6,010 | 6,010 | 6,010 | 6,010 | 6,010 | 5,880 | 5,980 |

**Specific gravity ratio (%): [(unfoamed regions − foamed region)/unfoamed regions] × 100

As is apparent from Table 4, in Working Examples 1 to 7 of the invention, a foamed region is present at a given position in the core interior (i.e., the intermediate portion of the foamed outer layer). As a result, in each of the Working Examples, the backspin rate of the golf ball on shots with a driver (W #1) or a six iron (I #6) was smaller than in Comparative Example 1, demonstrating that a spin rate-lowering effect on shots can be achieved.

The invention claimed is:

1. A method for manufacturing a golf ball having a core and a cover of one or more layer encasing the core, which core has a center core and a foamed outer layer that directly, or indirectly through another layer, envelops the center core, the foamed outer layer being a cured molding produced using a first curing mold having a cavity with an inside diameter $\phi 1$ and a second curing mold having a cavity with an inside diameter $\phi 2$ such that $\phi 1 < \phi 2$, which method comprises producing a core wherein the center core or a core inner layer sphere consisting of the center core encased by another layer is enveloped by the foamed outer layer via:

- a first curing step of peripherally enveloping the center core or the core inner layer sphere with an organic peroxide-containing rubber composition to form a rubber-encased sphere, subsequently placing the rubber-encased sphere in the first curing mold and applying heat and pressure under given temperature and time conditions to form a semi cured rubber-encased spherical molding; and
- a second curing step of removing the semi-cured rubber-encased spherical molding from the first mold following the first curing step, transferring the semi-cured rubber-encased spherical molding to the second curing mold and applying heat and pressure under given temperature and time conditions, wherein the foamed outer layer has an inside portion facing a center of the ball and an outside portion facing an outer side of the ball that are unfoamed regions, and contains a foamed region in an intermediate portion therebetween.

2. The golf ball manufacturing method of claim 1, wherein the curing time in the first curing step is in the range of from 33 to 60% of the sum of the curing time in the first curing step and the curing time in the second curing step.

* * * * *